(12) United States Patent
Nimmer et al.

(10) Patent No.: US 7,777,691 B1
(45) Date of Patent: Aug. 17, 2010

(54) SYSTEM AND METHOD FOR DRIVING MULTIPLE TILED DISPLAYS FROM A SINGLE DIGITAL VIDEO SOURCE

(75) Inventors: Mark J. Nimmer, Marion, IA (US); James P. Henderson, Cedar Rapids, IA (US); Martin J. Steffensmeier, Cedar Rapids, IA (US); Jeffrey D. Russell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 591 days.

(21) Appl. No.: 10/794,974

(22) Filed: Mar. 5, 2004

(51) Int. Cl.
*G09G 5/00* (2006.01)
(52) U.S. Cl. .................. 345/1.3; 345/1.2; 345/5
(58) Field of Classification Search ........... 345/1.1–1.3, 345/3.1–3.4, 698, 699, 4–6; 715/761
See application file for complete search history.

(56) References Cited

U.S. PATENT DOCUMENTS

| | | | | |
|---|---|---|---|---|
| 5,523,769 A | * | 6/1996 | Lauer et al. | 345/1.3 |
| 5,805,117 A | * | 9/1998 | Mazurek et al. | 345/1.1 |
| 5,815,168 A | | 9/1998 | May | 345/516 |
| 6,175,342 B1 | * | 1/2001 | Nicholson et al. | 345/1.1 |
| 6,292,157 B1 | | 9/2001 | Greene et al. | 345/1 |
| 6,498,592 B1 | * | 12/2002 | Matthies | 345/1.1 |
| 6,999,045 B2 | * | 2/2006 | Cok | 345/1.3 |
| 7,098,868 B2 | * | 8/2006 | Love et al. | 345/1.1 |
| 2004/0008155 A1 | | 1/2004 | Cok | |

* cited by examiner

*Primary Examiner*—Henry N Tran
(74) *Attorney, Agent, or Firm*—Matthew J. Evans; Daniel M. Barbieri

(57) ABSTRACT

Techniques and systems for driving multiple tiled displays from a single digital video source can include a plurality of displays arranged in tiled fashion to form a tiled display, a plurality of display drivers corresponding to the plurality of displays, and a video receiver board coupled to the plurality of display drivers via a communication bus. The video receiver board communicates streams of pixel information to the plurality of display drivers.

10 Claims, 7 Drawing Sheets

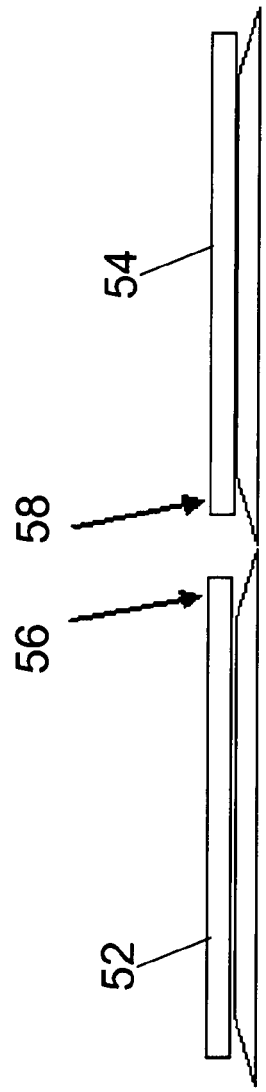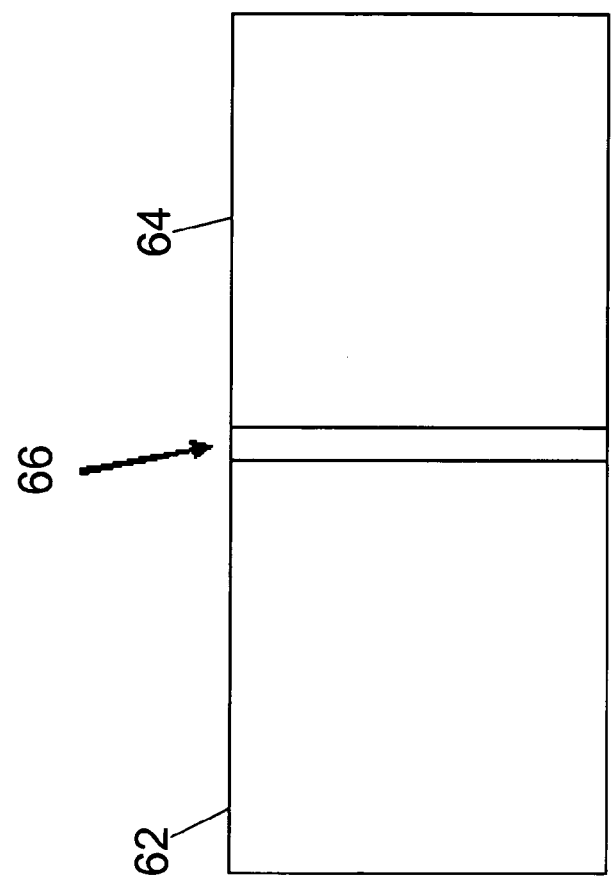

SYSTEM AND METHOD FOR DRIVING MULTIPLE TILED DISPLAYS FROM A SINGLE DIGITAL VIDEO SOURCE

FIELD OF THE INVENTION

The present invention relates to display systems consisting of tiled arrays. More specifically, the present invention relates to a system and method for driving multiple tiled displays from a single digital video source.

BACKGROUND OF THE INVENTION

Images on electronic displays are formed by an array of small picture elements known as pixels. In electronic color displays, these pixels may include three color elements that produce the primary colors red, blue and green for matching any other color. Usually arranged as squares or rectangles, the pixel array can be characterized by pixel pitch, P, a quantity that measures the density of pixels per unit distance.

Most commercial display products are manufactured as a single monolithic pixel array with a constant pixel pitch across the entire face of the display. While this configuration produces continuous images across the entire display, at the same time, it limits the sizes of the pixel arrays to what can be manufactured as a single display unit given the yield of the fabrication processes and assembly techniques employed.

In principle, larger displays including a plurality of adjacent display units, arranged as tiles like a bathroom floor, can be used to overcome the size limitations of manufacturing and assembly processes. Each tile displays a part of a larger virtual display area. However, using multiple display units has proven difficult for many reasons. For example, driving each display from a separate source is not practical or desired.

There is a need for a system and method of dividing a single input into non-overlapping sections of a larger total display. Further, there is a need for a large tiled display to be connected to a single digital video source, as any video monitor such that the user can make pixel or sub pixel alignment adjustments. Even further, there is a need to easily swap individual tiles in a tiled display.

SUMMARY OF THE INVENTION

The present invention relates to techniques and systems for driving multiple tiled displays from a single digital video source. An exemplary embodiment includes a system having a plurality of displays arranged in tiled fashion to form a tiled display, a plurality of display drivers corresponding to the plurality of displays, and a video receiver board coupled to the plurality of display drivers via a communication bus. The video receiver board communicates streams of pixel information to the plurality of display drivers.

Another exemplary embodiment relates to a tiled display including a number of individual displays located in a tiled arrangement, display drivers coupled to each of the number of individual displays, and a digital video input coupled to the display drivers. The digital video input communicates a unique pixel stream to each of the number of individual displays. The display drivers accept the unique pixel stream and the individual displays synchronize horizontal and vertical lines of pixels in the individual displays based on the unique pixel stream received from the digital video input.

Still another exemplary embodiment relates to a method of driving multiple displays in a tiled display using a single digital video source. The method includes receiving image information at a digital video board, and communicating pixel streams from the digital video board to a plurality of display drivers. The pixel streams are portions of the received image information.

Other principle features and advantages of the invention will become apparent to those skilled in the art upon review of the following drawings, the detailed description, and the appended claims.

BRIEF DESCRIPTION OF THE DRAWINGS

The exemplary embodiments will be described with reference to the accompanying drawings, wherein like numerals denote like elements.

FIG. 4 is a diagram of adjacent displays in a tiled display having wasted pixels;

FIG. 5 is a diagram of adjacent displays in a tiled display with overlapping pixels;

DETAILED DESCRIPTION OF EXEMPLARY EMBODIMENTS

Figure 1:
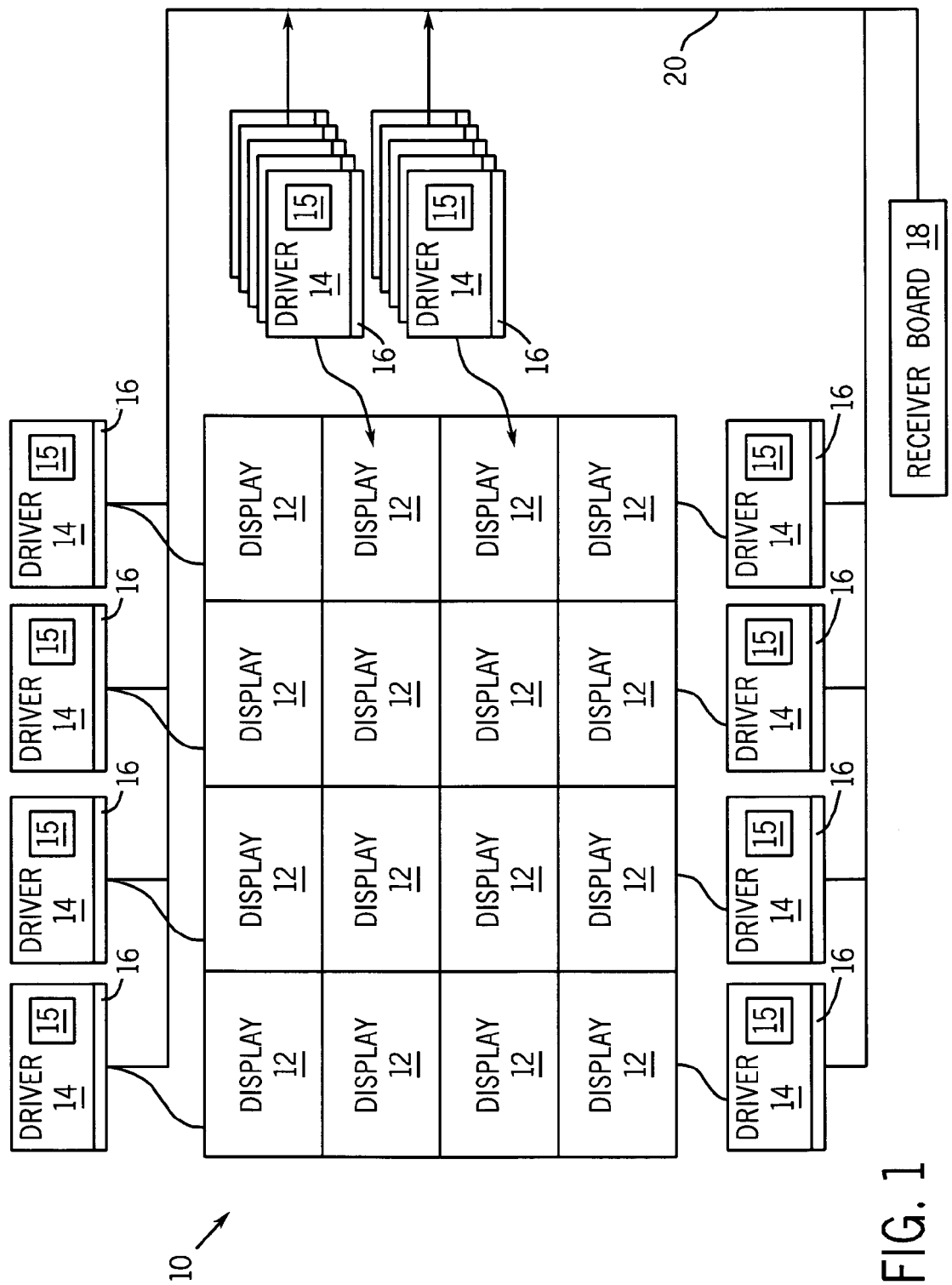
FIG. 1 is a diagram of a tiled display system in accordance with an exemplary embodiment.

Referring to FIG. 1, an exemplary tiled display 10 is comprised of multiple individual displays 12. The displays 12 can be flat-panel displays, such as liquid crystal displays (LCDs), active matrix LCDs, plasma displays, field emission displays, electroluminescent displays, digital mirror displays, or any other device that displays images. Each of the displays 12 is driven by an individual drive board 14 that receives a serial pixel stream of pixel display data for the pixels in the particular display 12 associated with the drive board 14.

Each individual drive board 14 includes a backplane edge connector 16 that connects the drive board 14 to a common backplane video receiver board 18. The receiver board 18 fans out the display data to each driver board 14. The individual driver boards 14 receive an entire digital video image via a common data bus 20. Each driver board 14 captures only the pixel streams corresponding to rows and columns that fit with a predefined size and start position of the displays 12. Each tile driver board 14 retains the start and stop coordinates in a local memory or hardware 15.

Each driver board 14 has a different start position as the tiles are arranged to create a contiguous display. Moreover, each driver board 14 is electrically and functionally independent of the others. As such, the displays 12 can be swapped around and easily re-assigned with a new position in the tiled display 10.

Figure 2:
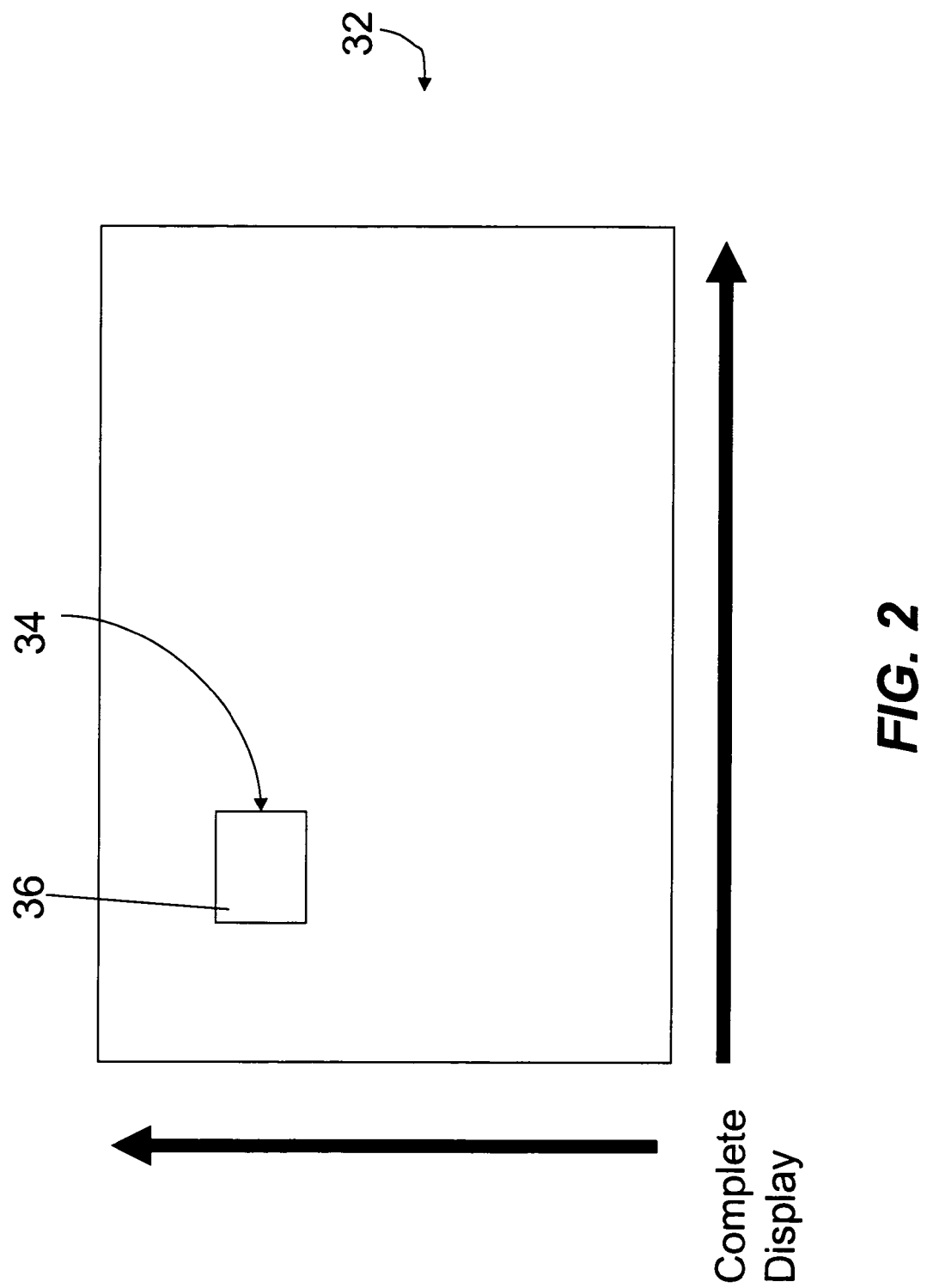
FIG. 2 is a diagram of tiled display having multiple tile displays in accordance with an exemplary embodiment.

FIG. 2 illustrates a tiled display 32 having a tile 34 with a start row and column 36. The tiled display 32 receives a pixel stream and horizontal and vertical sync only. Information on the location of the start row and column 36 is stored with a driver such that a stream of pixels received by the driver can be communicated to the tiled display 32 and presented in the correct location on the display.

The stream of pixels communicated to a particular display depends on its location in the tiled display. Displays can be physically swapped or moved within the display, but the location information is preferably communicated to the digital video input that communicates to all of the displays in the tiled display.

Figure 3:
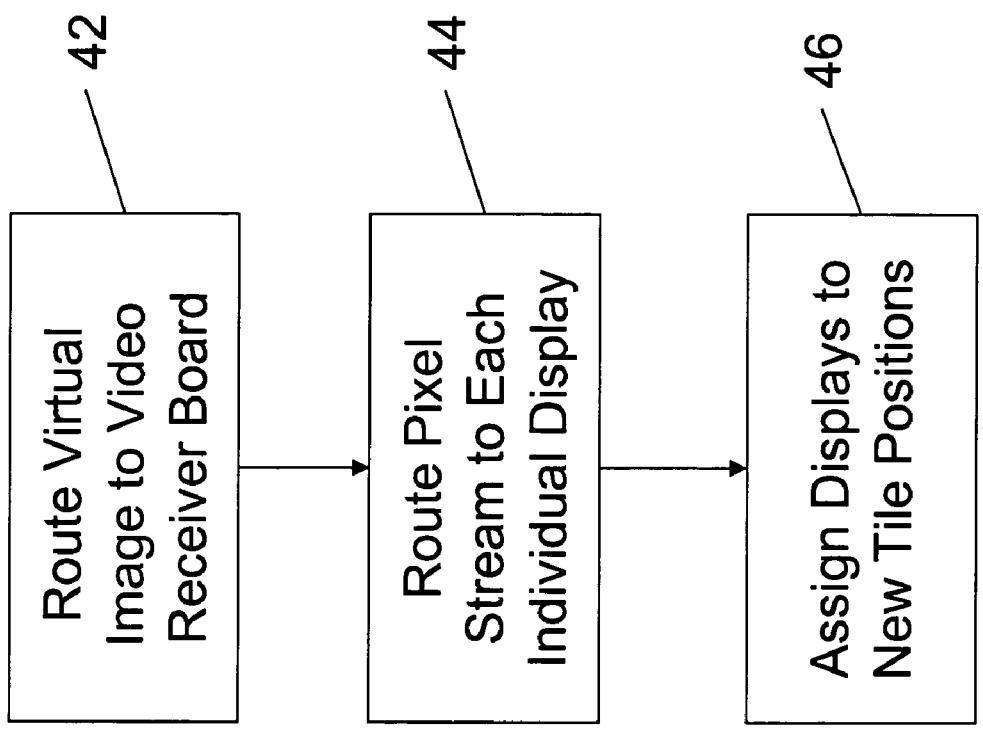
FIG. 3 is a flow diagram of a method of driving a tiled display from a single digital video source in accordance with an exemplary embodiment.

FIG. 3 illustrates a flow diagram depicting operations in a method for driving a tiled display from a single video source. Additional, fewer, or different operations may be performed in the method, depending on the embodiment. In an operation 42, a virtual image is routed to a video receiver board from a computer or other device having image information. In an operation 44, the video receiver board routes a pixel stream from the virtual image to the individual drivers of each display in the tiled display.

Sending an entire pixel stream to each display allows for adjustments to the relative positions of each display. Each display only receives the correct set of pixels corresponding to its location in the tiled display. The individual displays can be moved around and re-assigned new locations on the tiled display. In an operation 46, the video receiver board receives a command to assign the displays to new tile positions. Such a command may come from a computer programmed to configure the tiled display.

FIG. 4 illustrates two adjacent displays 52 and 54 having wasted pixels 56 and 58. Wasted pixels refer to pixels that because of their position do not contribute to the formation of the image presented by the display. The receiver board 18 described with reference to FIG. 1 can account for the wasted pixels 56 and 58 and adjust the pixel stream communicated to the displays 52 and 54. Having positional information for each display, the receiver board 18 can recognize that pixels are wasted based on the configuration of the displays. Similarly, FIG. 5 illustrates two adjacent displays 62 and 64 having overlapping pixels 66. Overlapping pixels refers to pixels that are positioned immediately next to or proximate pixels from an adjacent display. The receiver board 18 can account for the overlapping pixels 66 and communicate pixel streams accordingly.

Figure 6:
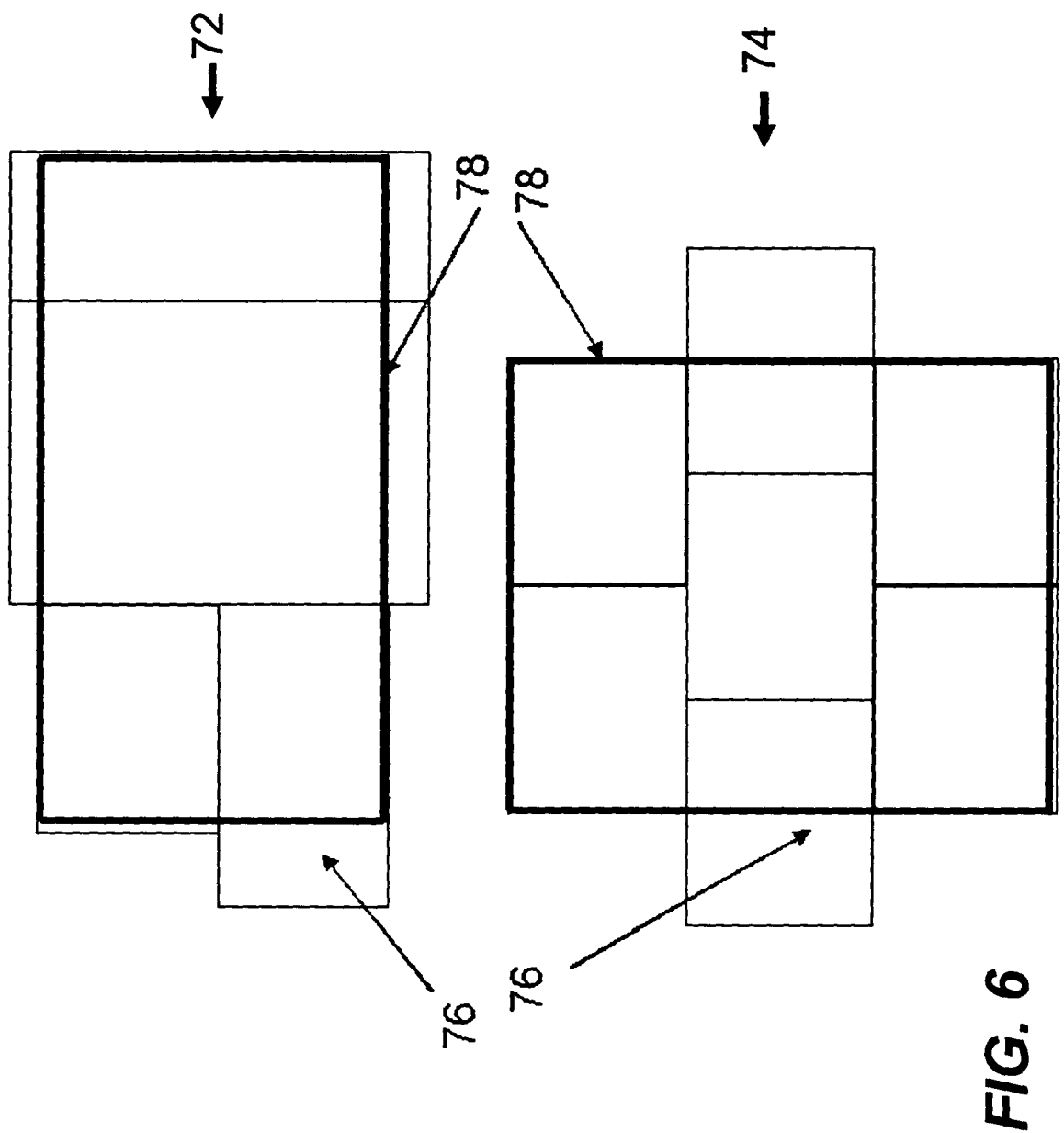
FIG. 6 is a diagram of two tiled displays having oddly distributed displays or displays of different sizes.

FIG. 6 illustrates tiled displays 72 and 74. The tiled displays 72 and 74 have oddly distributed displays and/or displays of different sizes. Due to their configurations, the tiled displays 72 and 74 have wasted or hidden spaces 76 and useful display areas 78. The useful display areas 78 are generally rectangular shaped. In alternative embodiments, tiled displays with oddly distributed displays and/or displays of different sizes are completely utilized. In either case, the receiver board 18 described with reference to FIG. 1 is provided with locational information regarding the individual displays that constitute the tiled display.

Figure 7:
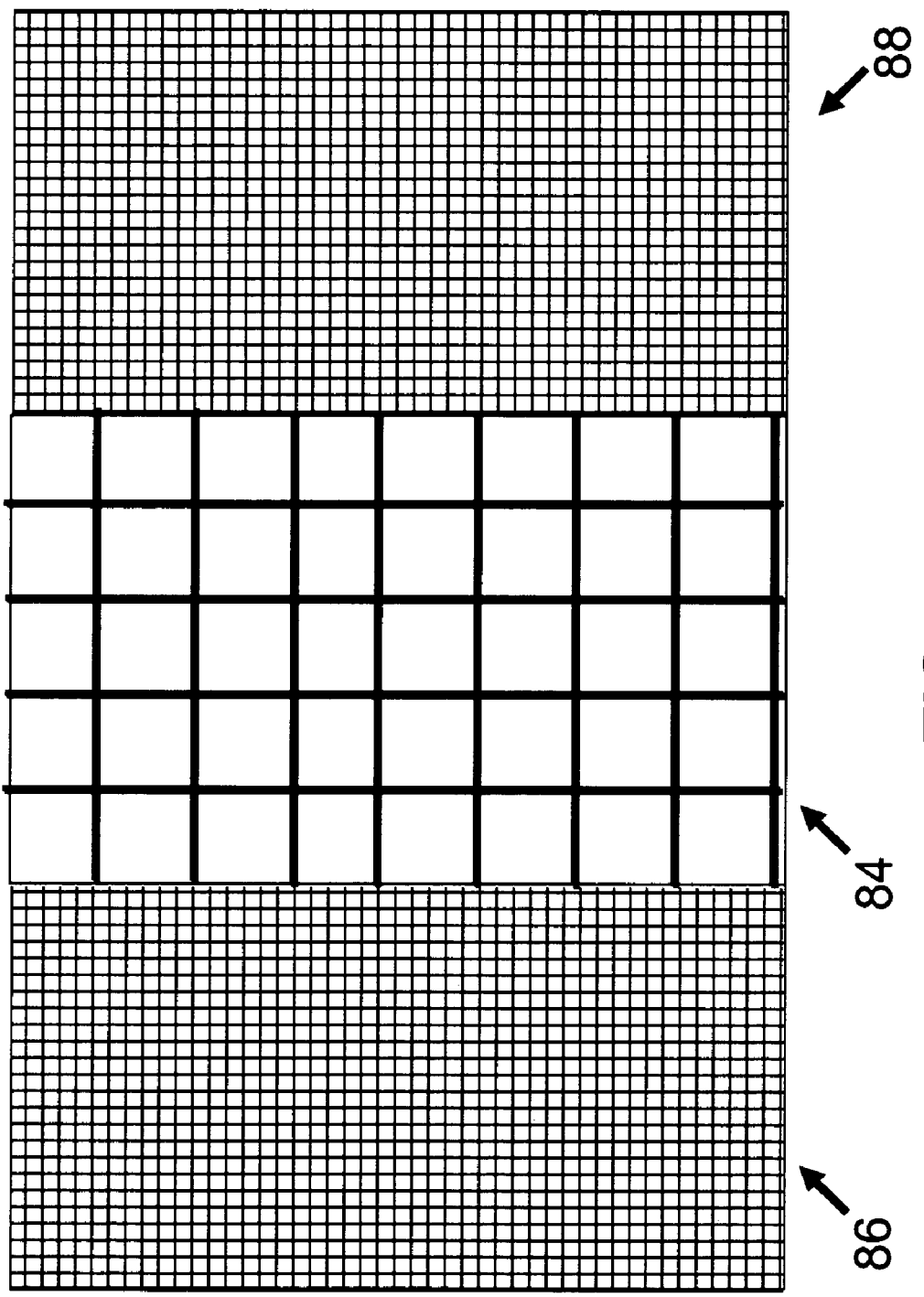
FIG. 7 is a tiled display having a different scale setting for a section of the tiled display.

FIG. 7 illustrates a tiled display 82 having a different scale setting for a section 84 of the tiled display. In the section 84, a higher zoom scale is used, meaning that images displayed in the section 84 appear larger or closer to the viewer than in sections 86 and 88. The receiver board 18 described with reference to FIG. 1 can communicate pixel streams having the scaled information contained within. That is, the pixel streams communicated to the section 84 have been adjusted by software to provide the zoom effect or appearance.

Figure 8:
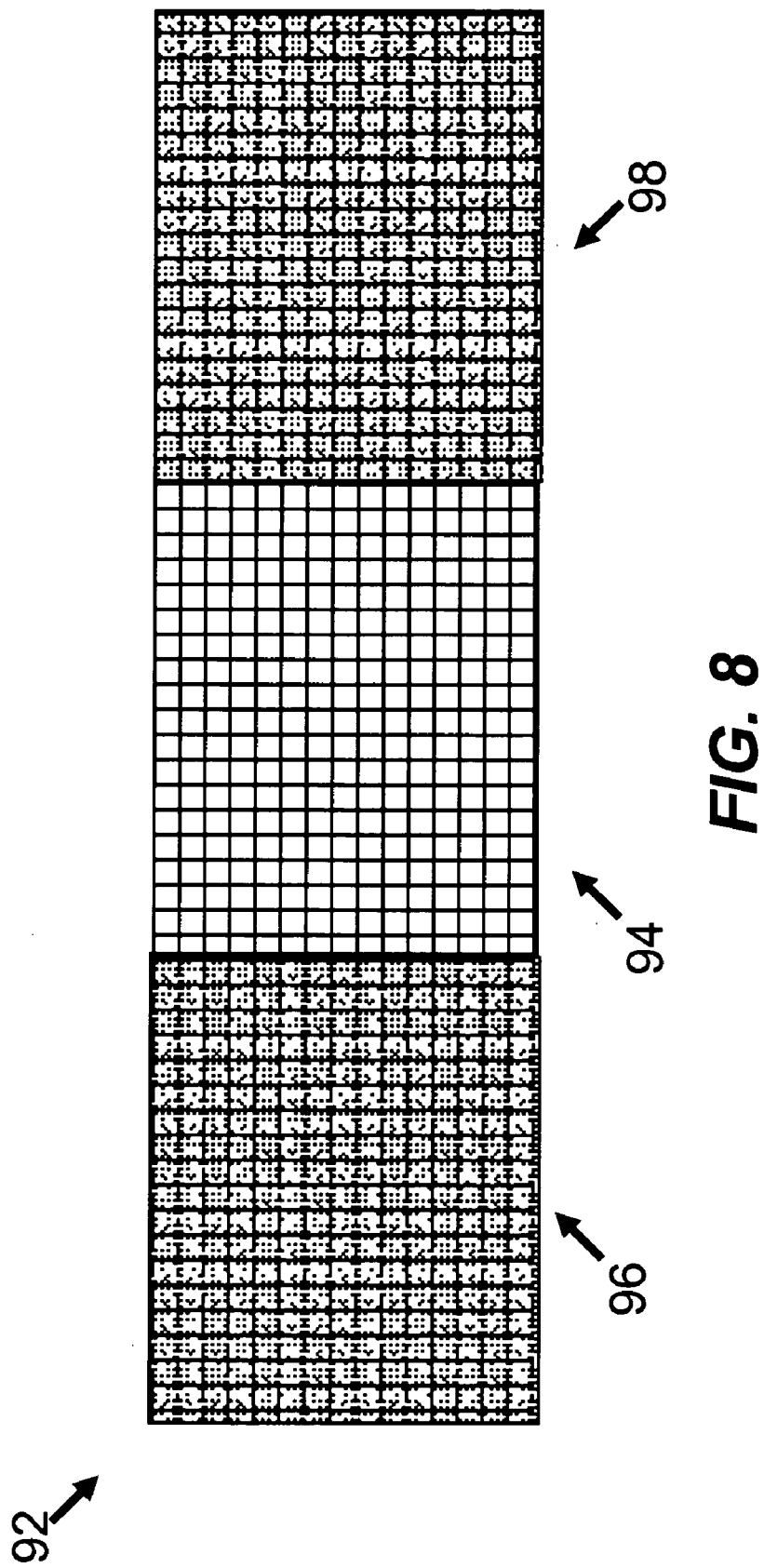
FIG. 8 is a tiled display having different resolution settings for sections of the tiled display.

FIG. 8 illustrates a tiled display 92 having different resolution settings for sections of the tiled display. By way of example, a middle section 94 may have a higher resolution setting than end sections 96 and 98. The displays used in end sections 96 and 98 of the tiled display 92 may have too low resolution capabilities to properly construct the original image. The receiver board 18 described with reference to FIG. 1 may not make any adjustments for the resolution capabilities of the end sections 96 and 98. Consideration for the resolution capabilities may be made in software.

It is understood that although the detailed drawings and specific examples describe exemplary embodiments of a system and method for driving multiple tiled displays from a single digital video source, they are for purposes of illustration only. The exemplary embodiments are not limited to the precise details and descriptions described herein. For example, although particular devices and structures are described, other devices and structures could be utilized according to the principles of the present invention. Various modifications may be made and the details disclosed without departing from the spirit of the invention as defined in the following claims.

What is claimed is:

1. A system for driving multiple displays in a tiled display from a single digital video source, the system comprising:
   a plurality of displays arranged in tiled fashion to form a tiled display;
   a plurality of display drivers corresponding to the plurality of displays; and
   a video receiver board coupled to the plurality of display drivers via a communication bus, the video receiver board communicating streams of pixel information to the plurality of display drivers;
   wherein the plurality of display drivers each retains start and stop coordinates in a local memory.

2. A system for driving multiple displays in a tiled display from a single digital video source, the system comprising:
   a plurality of displays arranged in tiled fashion to form a tiled display;
   a plurality of display drivers corresponding to the plurality of displays; and
   a video receiver board coupled to the plurality of display drivers via a communication bus, the video receiver board communicating streams of pixel information to the plurality of display drivers;
   wherein the plurality of displays are assigned to tile positions in the tiled display and the tile positions are swapped with a command communicated to the video receiver board.

3. A tiled display comprising:
   a number of individual displays located in a tiled arrangement; display drivers coupled to each of the number of individual displays; and
   a digital video input coupled to the display drivers, the digital video input communicates a unique pixel stream to each of the number of individual displays, wherein the display drivers accept the unique pixel stream and the individual displays synchronize horizontal and vertical lines of pixels in the individual displays based on the unique pixel stream received from the digital video input;
   wherein the individual displays are assigned to tile positions in the tiled display and the tile positions are swapped with a command communicated to the digital video input.

4. A tiled display comprising:
   a number of individual displays located in a tiled arrangement;
   display drivers coupled to each of the number of individual displays; and
   a digital video input coupled to the display drivers, the digital video input communicates a unique pixel stream to each of the number of individual displays, wherein the display drivers accept the unique pixel stream and the individual displays synchronize horizontal and vertical lines of pixels in the individual displays based on the unique pixel stream received from the digital video input;

wherein each display driver retains start and stop coordinates in a local memory.

5. A tiled display comprising:

a number of individual displays located in a tiled arrangement;

display drivers coupled to each of the number of individual displays; and a digital video input coupled to the display drivers, the digital video input communicates a unique pixel stream to each of the number of individual displays, wherein the display drivers accept the unique pixel stream and the individual displays synchronize horizontal and vertical lines of pixels in the individual displays based on the unique pixel stream received from the digital video input;

wherein the digital video input accounts for wasted pixels in adjacent individual displays.

6. A tiled display comprising:

a number of individual displays located in a tiled arrangement;

display drivers coupled to each of the number of individual displays; and a digital video input coupled to the display drivers, the digital video input communicates a unique pixel stream to each of the number of individual displays, wherein the display drivers accept the unique pixel stream and the individual displays synchronize horizontal and vertical lines of pixels in the individual displays based on the unique pixel stream received from the digital video input;

wherein the digital video input accounts for overlapping pixels in adjacent individual displays.

7. A method of driving multiple displays in a tiled display using a single digital video source, the method comprising:

receiving image information at a digital video board; and communicating pixel streams from the digital video board to a plurality of display drivers, wherein the pixel streams are portions of the received image information;

wherein the plurality of display drivers each retains start and stop coordinates in a local memory.

8. A method of driving multiple displays in a tiled display using a single digital video source, the method comprising:

receiving image information at a digital video board;

communicating pixel streams from the digital video board to a plurality of display drivers, wherein the pixel streams are portions of the received image information; and receiving a tile position command at the digital video board and configuring communication of the pixel streams based on the tile position command.

9. A method of driving multiple displays in a tiled display using a single digital video source, the method comprising:

receiving image information at a digital video board; and communicating pixel streams from the digital video board to a plurality of display drivers, wherein the pixel streams are portions of the received image information;

wherein communicating pixel streams from the digital video board to a plurality of display drivers comprises communicating pixel streams to display drivers corresponding to displays in a useful display area.

10. A method of driving multiple displays in a tiled display using a single digital video source, the method comprising:

receiving image information at a digital video board; and communicating pixel streams from the digital video board to a plurality of display drivers, wherein the pixel streams are portions of the received image information;

wherein the digital video board accounts for wasted pixels in adjacent individual displays.

* * * * *